Patented Mar. 4, 1924.

1,485,379

UNITED STATES PATENT OFFICE.

WILLIAM H. ENGELS, OF RAHWAY, NEW JERSEY, ASSIGNOR TO MERCK & CO., OF NEW YORK, N. Y., A CORPORATION OF NEW YORK.

ANTISPASMODIC COMPOUND AND PROCESS OF PRODUCING THE SAME.

No Drawing. Original application filed April 25, 1922, Serial No. 556,424. Divided and this application filed May 13, 1922. Serial No. 560,720.

*To all whom it may concern:*

Be it known that I, WILLIAM H. ENGELS, a citizen of the Republic of Germany, and a resident of Rahway, in the county of Union and State of New Jersey, have invented certain new and useful Improvements in Antispasmodic Compounds and Processes of Producing the Same of which the following is a specification.

Although benzyl sulfuric acid, benzyl phosphoric acid, benzyl succinic acid and benzyl phthalic acid have been mentioned in chemical literature as laboratory products (Beilstein II., p. 1050; II. Erg., pp. 638 and 1048; Berichte, 35, p. 4078), none of them has, so far as I know, received any industrial application, and particularly none in the therapeutic art.

So far as I know, in the only benzylesters which have heretofore received any industrial or therapeutic application (e. g., benzylbenzoate, benzylcinnamate, dibenzylsuccinate, benzylsalicylate, and others), the acid group has been fully saturated by the benzyl group or groups, and a heretofore insurmountable obstacle to their use hypodermically has been their insolubility in water, in consequence of which their therapeutic use has been substantially limited to administration per os.

I have produced, for the first time, benzylester compounds and, specifically, alkali benzyl succinates, especially sodium benzyl succinate, of a water-solubility and purity compatible with hypodermic, intravenous and subcutaneous use, and a process by which they may be obtained, and I believe that I have not merely converted certain unused substances into products of great utility, but have greatly enlarged the medicinally important field of antispasmodic remedies.

My invention also involves the discovery of the conditions under which any by-products that may be present with the unsaturated benzyl succinate are eliminated at the same time that the ester is transformed into a water-soluble condition, so that I obtain a therapeutically pure crystalline water-soluble benzyl succinate.

My present application is a division of my application Serial No. 556,424, which was filed in the United States Patent Office on or about April 25, 1922.

To explain one method by which my invention may be carried out, the following example is given:

1 kilogram succinic acid monobenzylester is dissolved in 4 litres alcohol (92–95%), heated to about 80°, neutralized with anhydrous sodium carbonate and filtered hot. On cooling, the sodium monobenzylsuccinate crystallizes out and may be recovered from the mother liquor in the customary way.

It will be observed that in the illustrative example, the process is carried out under anhydrous conditions. This is to enable this step to accomplish the dual function of producing therapeutic purity as well as water-solubility, the by-products, if any, present with the ester being retained in the acetone or alcohol solvent.

In the illustrative example of my process, I have mentioned sodium carbonate as the neutralizing compound. It will be understood, however, that other alkali compounds, such, for example, as ammonium, potassium or lithium carbonates or hydroxides are to be considered as equivalents.

What I claim and desire to secure by Letters Patent of the United States is:

1. As an antispasmodic adapted for hypodermic injection, a therapeutically pure alkali benzyl succinate.

2. As an antispasmodic adapted for hypodermic injection, therapeutically pure sodium benzyl succinate.

3. The process of making an alkali benzyl succinate which consists in treating succinic acid monobenzylester with an alkali base under substantially anhydrous conditions, and isolating the salt.

4. The process of simultaneously purifying and rendering water-soluble succinic acid partially saturated by a benzyl group, which consists in completing the saturation by combination with an alkali under substantially anhydrous conditions.

WILLIAM H. ENGELS.

Witnesses:
R. E. GRUBER,
F. W. HENDERSHOTT.